R. ESMOND.

Presses.

No. 5,613. Reissued Oct. 21, 1873.

Witnesses:
Ernst Bilhuber.
Henry Sentner.

Inventor:
Richard Esmond
per
Van Santvoord & Hauff
attys

A.M. PHOTO-LITHOGRAPHIC Co. N.Y. (OSBORNE'S PROCESS)

UNITED STATES PATENT OFFICE.

RICHARD ESMOND, OF NEW YORK, N. Y., ASSIGNOR TO THE UNITED POWER-PRESS COMPANY.

IMPROVEMENT IN PRESSES.

Specification forming part of Letters Patent No. 142,220, dated August 26, 1873; reissue No. 5,613, dated October 21, 1873; application filed October 10, 1873.

*To all whom it may concern:*

Be it known that I, RICHARD ESMOND, of the city, county, and State of New York, have invented a new and useful Improvement in Presses; and I do hereby declare the following to be a full, clear, and exact description thereof, which will enable those skilled in the art to make and use the same, reference being had to the accompanying drawing forming part of this specification, in which drawing—

Figure 1:
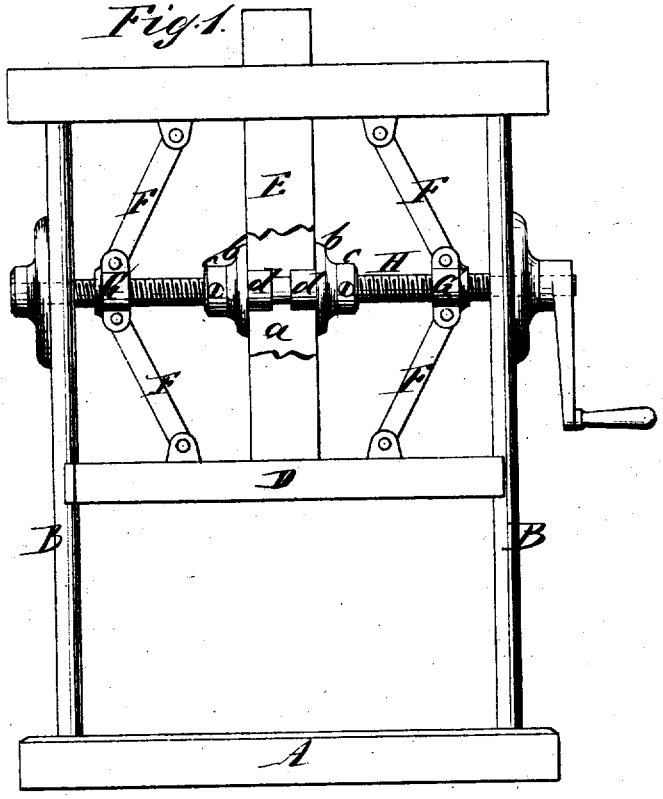
Figure 2:
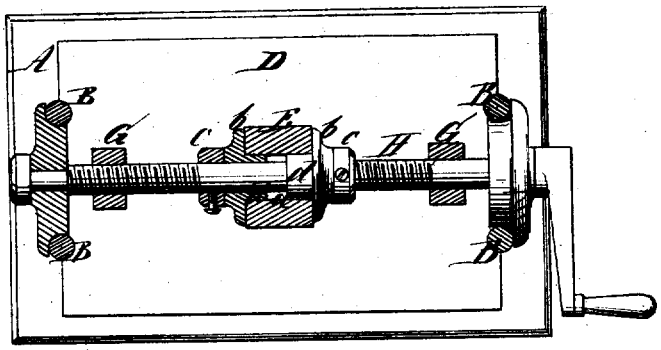

Figure 1 represents a sectional front view of this invention. Fig. 2 is a horizontal section of the same.

Similar letters indicate corresponding parts.

This invention consists in the arrangement of stops contiguous to the sides of a single standard rising from the follower of a press through the head-block, said stops being mounted on a right-and-left-hand screw-spindle, which acts, by means of toggle-levers, on the follower in such a manner that, by the combined action of the standard and of the stops, the screw-spindle and the follower are retained in a position parallel to each other, and the operation of the press is rendered free and easy; further, in the arrangement of anti-friction disks and stops on the right-and-left-hand screw, which acts, by means of nuts and toggle-levers, on the follower of a press, said friction-disks being provided with projections and made to act, in connection with the standard rising from the follower, in such a manner that, by said friction-disks and stops, the screw-spindle is effectually prevented from being displaced, either in the direction of its axis or in a direction transversely to said axis, and by these means the correct operation of the press is insured.

In the drawing, the letter A designates the foot-block of my press, which connects, by uprights B B, with the head-block C. The uprights B form the guides for the follower D, and from this follower extends a standard, E, through a mortise of the head-block. The follower and head-block are connected by toggle-levers F, the inner ends of which are pivoted to traveling nuts G, through which extends a right-and-left-hand screw, H. By turning this screw-spindle the nuts G are caused to move toward or from each other, and the follower D is depressed or raised. The screw-spindle passes through a mortise, *a*, in the standard E, and on said spindle are mounted two disks, *b b*, one on each side of and contiguous to the standard, and from said disks project hubs *d*, into the mortise of the standard E. By these means the spindle is prevented from moving in the direction of its axis, and at the same time it cannot bind in the mortise of the standard, since the hubs of the disks retain it securely in position. Said disks are mounted loosely on the screw-spindle, and retained in position by stops *c*, so that they can revolve independent of the spindle, and that they will act as anti-friction disks.

By this arrangement the operation of the press is materially facilitated; the screw-spindle is not liable to be thrown out of its proper position, and in operating the press much power is saved, while at the same time the durability of the mechanism is materially increased.

By applying the disks or stops *b* contiguous to the outer surface of a single standard, E, the operation of mounting the press is facilitated; the disks can be readily adjusted in position after the spindle has been passed through the standard, and the disks can be increased to any desired extent, so that the same present good bearing-surfaces against the sides of the standard, and thereby the stability of the screw-spindle during the operation of the press is increased.

What I claim as new, and desire to secure by Letters Patent, is—

1. The stops *c*, mounted on a right-and-left-hand screw-spindle, which acts, by means of toggle-levers, on the follower, said stops being contiguous to the sides of a single standard rising from the follower of a press through the head-block, substantially as and for the purpose specified.

2. The disks *b b*, having projecting hubs mounted loosely upon the endless screw H contiguous to the standard E, and retained in place by stops *c*, in combination with the toggle-levers F, traveling nuts G, and follower D, all constructed and operating as herein shown and described.

This specification signed by me this 1st day of October, 1873.

RICHARD ESMOND.

Witnesses:
W. HAUFF,
E. F. KASTENHUBER.